US010889299B2

(12) United States Patent
Yasutomi

(10) Patent No.: US 10,889,299 B2
(45) Date of Patent: Jan. 12, 2021

(54) DRIVING ASSIST APPARATUS FOR VEHICLE

(71) Applicant: Toyota Jidosha Kabushiki Kaisha, Toyota (JP)

(72) Inventor: Taisuke Yasutomi, Ebina (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 187 days.

(21) Appl. No.: 16/284,176

(22) Filed: Feb. 25, 2019

(65) Prior Publication Data

US 2019/0263409 A1 Aug. 29, 2019

(30) Foreign Application Priority Data

Feb. 26, 2018 (JP) .................................. 2018-031435

(51) Int. Cl.
   - B60W 30/18 (2012.01)
   - B60W 10/184 (2012.01)
   - B60W 10/12 (2012.01)

(52) U.S. Cl.
   CPC ...... B60W 30/18145 (2013.01); B60W 10/12 (2013.01); B60W 10/184 (2013.01); *B60W 2520/10* (2013.01); *B60W 2520/28* (2013.01); *B60W 2720/40* (2013.01)

(58) Field of Classification Search
   CPC ......... B60W 30/18145; B60W 10/184; B60W 10/12; B60W 2720/40; B60W 2520/10; B60W 2520/28; B60W 30/18063; B60W 30/045; B60W 2540/18; B60T 2201/14; B60T 2201/16; B60T 7/12

USPC ........................................................ 701/41
See application file for complete search history.

(56) References Cited

U.S. PATENT DOCUMENTS

| 5,090,510 | A | * | 2/1992 | Watanabe | .......... | B60K 23/0808 |
| | | | | | | 180/197 |
| 5,270,930 | A | * | 12/1993 | Ito | ....................... | B60K 17/346 |
| | | | | | | 701/69 |
| 7,463,964 | B2 | * | 12/2008 | Ushiroda | ................ | B60T 8/172 |
| | | | | | | 701/80 |
| 7,761,215 | B2 | * | 7/2010 | Miura | ................. | B60W 30/045 |
| | | | | | | 701/72 |
| 8,892,309 | B2 | * | 11/2014 | Fujita | .................... | B62D 7/159 |
| | | | | | | 701/41 |

(Continued)

FOREIGN PATENT DOCUMENTS

| JP | 2013129254 A | * | 7/2013 |
| JP | 2013129254 A | | 7/2013 |

*Primary Examiner* — Jonathan M Dager
*Assistant Examiner* — Jean W Charleston
(74) *Attorney, Agent, or Firm* — Dinsmore & Shohl LLP

(57) ABSTRACT

This driving assist apparatus for a vehicle sets target wheel speed of an inside rear wheel in turning to substantially zero when a state of a center differential apparatus is a locked state in a case where the vehicle is turned in an extremely low speed traveling control. Further, the apparatus sets target wheel speed of each of wheels other than the inside rear wheel in turning such that a mean value of target wheel speeds of front wheels is equal to a mean value of target wheel speeds of rear wheels and the mean value of target wheel speeds of front wheels is equal to target vehicle body speed. Furthermore, the apparatus adjusts driving force and braking force such that wheel speed of each of the wheels becomes equal to the target wheel speed set for each of the wheels.

3 Claims, 5 Drawing Sheets

(56) References Cited

U.S. PATENT DOCUMENTS

| | | | |
|---|---|---|---|
| 10,392,008 B2* | 8/2019 | Watanabe | B60W 10/184 |
| 2013/0310217 A1* | 11/2013 | Terakawa | B60L 7/14 |
| | | | 477/5 |
| 2017/0225686 A1* | 8/2017 | Takaso | B60W 30/12 |

* cited by examiner

DRIVING ASSIST APPARATUS FOR VEHICLE

CROSS-REFERENCE TO RELATED APPLICATION

This application claims priority to Japanese Patent Application No. 2018-031435 filed on Feb. 26, 2018, incorporated herein by reference in its entirety.

BACKGROUND

1. Technical Field

The present disclosure relates to a driving assist apparatus for a vehicle, which can perform turning assist control for making wheel speed of a inside wheel in turning lower than wheel speed of an outside wheel in the turning by giving braking force to the inside wheel in the turning.

2. Description of the Related Art

Conventionally, a driving assist apparatus for a vehicle, which can perform extremely low speed traveling control (hereinafter referred to as "crawl control") for making a vehicle travel at predetermined extremely low speed without requiring an accelerator operation and brake operation by a driver has been known. For example, one of such driving assist apparatuses for a vehicle (hereinafter referred to as "conventional apparatus") can perform the above-mentioned turning assist control (hereinafter referred to as "turn assist control" or "TA control") when making the vehicle travel at extremely low speed of 5 km/h or less by the above-mentioned crawl control (for example, refer to Japanese Patent Application Laid-Open (Kokai) No. 2013-129254).

More specifically, the conventional apparatus gives braking force to an inside rear wheel in turning by the turn assistant control, and sets wheel speed of the inside rear wheel in the turning to zero when the vehicle is traveling in accordance with the crawl control. Thereby, the conventional apparatus can make the vehicle turn with a turning radius smaller than the minimum turning radius in its vehicle specifications. Such turning assist control is effective for making a vehicle largely change its route when the vehicle is traveling on a rough road, for example.

By the way, in the conventional apparatus, one of execution permission conditions for the turn assist control is a state where a center differential apparatus of a vehicle allows a differential between a rotating shaft for front wheels and a rotating shaft for rear wheels (hereinafter referred to as "free state"). However, in order to raise turning performance while securing rough road traveling ability of a vehicle, it is desirable that the turn assist control can be performed even in a state where the center differential apparatus does not allow the differential between the rotating shaft for front wheels and the rotating shaft for rear wheels (hereinafter referred to as "locked state").

However, when the turn assistant control is performed, wheel speed of an inside rear wheel in turning becomes lower than wheel speed in a case where the vehicle is turned by steering (for example, it is made to zero) since braking force is given to the inside rear wheel in the turning. In this case, when wheel speed of an outside rear wheel in the turning is controlled to be "wheel speed in the case where the vehicle is turned by steering", a mean value of the wheel speed of the inside rear wheel in the turning and the wheel speed of the outside rear wheel in the turning (rear wheel mean value) becomes lower than the rear wheel mean value before execution of turning assist control is started. Namely, rotational speed of a rotating shaft for rear wheels when the turning assist control is performed becomes lower than the rotational speed of the rotating shaft for rear wheels before the execution of the turning assist control is started.

Therefore, when the turning assist control is performed in a state where the crawl control is performed and the state of the center differential apparatus is the locked state, rotational speed of a rotating shaft for front wheels falls in association with decrease in the rotational speed of the rotating shaft for rear wheels. As a result, a problem that a strong deceleration feeling (sense of discomfort) is given to a driver of the vehicle may occur.

SUMMARY

The present disclosure has been made in order to cope with the problem. Namely, one of objectives of the present disclosure is to provide a driving assist apparatus for a vehicle with a small possibility that a strong deceleration feeling may be given to a driver even when the turning assist control is performed in a state where the crawl control is performed and the state of the center differential apparatus is the locked state.

A driving assist apparatus for a vehicle, according to the present disclosure (hereinafter referred to as "present apparatus") in order to attain the objective is applied to a vehicle (10) comprising a plurality of wheels (W), a driving device (20), a rotating shaft (33) for front wheels, a differential gear (35) for front wheels, a rotating shaft (34) for rear wheels, a differential gear (37) for rear wheels, a center differential apparatus (311), and a brake apparatus (40).

The plurality of the wheels include a front left wheel (WFL), a front right wheel (WFR), a rear left wheel (WRL), and a rear right wheel (WRR). The driving device generates driving force for the vehicle (10). The rotating shaft for front wheels is an axial body which transmits the driving force to the front left wheel and the front right wheel. The differential gear for front wheels is disposed between the front left wheel and front right wheel and the rotating shaft for front wheels, and allows differential between the front left wheel and the front right wheel. The rotating shaft for rear wheels is an axial body which transmits the driving force to the rear left wheel and the rear right wheel. The differential gear for rear wheels is disposed between the rear left wheel and rear right wheel and the rotating shaft for rear wheels, and allows differential between the rear left wheel and the rear right wheel.

The center differential apparatus can selectively realize at least two states of a free state that is a state where differential between the rotating shaft for front wheels and the rotating shaft for rear wheels is allowed and a locked state that is a state where the rotating shaft for front wheels and the rotating shaft for rear wheels are directly connected. Furthermore, the center differential apparatus is configured such that a ratio of rotational speed of the rotating shaft for rear wheels to rotational speed of the rotating shaft for front wheels becomes a predetermined ratio in the locked state. The brake apparatus gives braking force to each of the plurality of the wheels.

The present apparatus comprises a wheel speed detector (80, 98) and a control part (60, 70, 80). The wheel speed detector detects wheel speed of each of the plurality of the wheels. The control part performs "extremely low speed traveling control" in which the driving force generated by the driving device and the braking force given to each of the plurality of the wheels by the brake apparatus are adjusted such that vehicle body speed of the vehicle is in agreement with a predetermined target vehicle body speed ($\omega a$), without requiring an accelerator operation and a brake operation by a driver of the vehicle (Step 520, Step 525, Step 530).

By the way, as mentioned above, when the turning assist control is performed when the extremely low speed traveling control is performed and the state of the center differential apparatus is the locked state, the problem that a strong deceleration feeling is given to a driver of the vehicle may arise.

In order to solve such a problem, the control part is configured to perform the following "turning assist control" when a predetermined turning assist control request occurs and the state of the center differential apparatus is the locked state (Step 540: "No") in a case where the vehicle is turned by the front left wheel and the front right wheel being steered in a state where the "extremely low speed traveling control" is performed.

The control part is configured to set target wheel speed of the inside rear wheel in turning among the plurality of the wheels to wheel speed lower than wheel speed of the inside rear wheel in turning in a case where the vehicle is turned by steering (Step 565).

Furthermore, the control part is configured to respectively set target wheel speed of each of wheels other than the inside rear wheel in turning among the plurality of the wheels such that:

(1) a ratio of a "target rear wheel mean value that is a mean value of target wheel speed of the rear left wheel and target wheel speed of the rear right wheel" to a "target front wheel mean value that is a mean value of target wheel speed of the front left wheel and target wheel speed of the front right wheel" is equal to the predetermined ratio and (2) the target front wheel mean value becomes equal to the target vehicle body speed (Step 565).

In addition, the control part is configured to adjust the driving force generated by the driving device and the braking force given respectively to the plurality of the wheels by the brake apparatus such that the wheel speed detected for each of the plurality of the wheels becomes equal to the target wheel speed set for each of the plurality of the wheels (Step 535, Step 570, Step 575, Step 580).

In accordance with the present apparatus which has such a configuration, the mean value of wheel speed of the front left wheel and wheel speed of the front right wheel set by the turning assist control (front wheel mean value) becomes equivalent to the front wheel mean value before the turning assist control is performed. In other words, the front wheel mean value is substantially in agreement with the target vehicle body speed. Furthermore, the mean value of wheel speed of the rear left wheel and wheel speed of the rear right wheel set by the turning assist control (rear wheel mean value) becomes equivalent to the rear wheel mean value before the turning assist control is performed. Namely, the rotational speed of the rotating shaft for front wheels and the rotational speed of the rotating shaft for rear wheels do not change substantially before and after the execution of the turning assist control is started.

Therefore, in accordance with the present apparatus, even when the state of the center differential apparatus is the locked state under the extremely low speed traveling control, the rotational speed of the rotating shaft for front wheels can be maintained before and after the execution of the turning assist control is started. Namely, the rotational speed of the rotating shaft for front wheels can be prevented from falling. As a result, a possibility that a deceleration feeling is given to a driver when the execution of the turning assist control is started can be reduced.

In one aspect of the present apparatus, the control part is configured to set the target wheel speed of the inside rear wheel in turning in the turning assist control to zero.

In accordance with this aspect, since a vehicle rotates with the inside rear wheel in turning as a substantial fulcrum, the vehicle can be turned with a radius greatly smaller as compared with the minimum turning radius in its vehicle specifications.

In one aspect of the present apparatus, when the predetermined ratio is 1, the control part is configured to, set the target wheel speed of an outside rear wheel in turning in the turning assist control to a value ($2\omega a$) that is twice as much as the target vehicle body speed ($\omega a$), set the target wheel speed of an inside front wheel in turning in the turning assist control to a value ($\omega a - \omega b$) obtained by subtracting a predetermined value ($\omega b$) from the target vehicle body speed ($\omega a$), and set the target wheel speed of an outside front wheel in turning in the turning assist control to a value ($\omega a + \omega b$) obtained by adding the predetermined value ($\omega b$) to the target vehicle body speed ($\omega a$).

In accordance with this aspect, when the target wheel speed of the inside rear wheel in turning is set to zero, the target front wheel mean value and the target rear wheel mean value can be made equal to the target vehicle body speed ($\omega a$), respectively. Namely, in accordance with this aspect, the rotational speed of the rotating shaft for front wheels and the rotational speed of the rotating shaft for rear wheels can be made equal to each other, and no change occurs in the rotational speed of the rotating shaft for front wheels and the rotational speed of the rotating shaft for rear wheels before and after the execution of the turning assist control is started. Consequently, a possibility that a deceleration feeling is given to a driver when the execution of the turning assist control is started can be reduced.

In the explanation, in order to help understanding of the present disclosure, titles and/or reference signs used in embodiments which will be mentioned later are attached in parenthesis to configurations of the disclosure corresponding to the embodiments. However, constituents of the present disclosure are not limited to the embodiments specified with the titles and/or reference signs. Other objectives, other features, and accompanying advantages of the present disclosure will be easily understood from the following explanation about embodiments of the present disclosure described referring to drawings.

DETAILED DESCRIPTION (Configuration)

Figure 1:
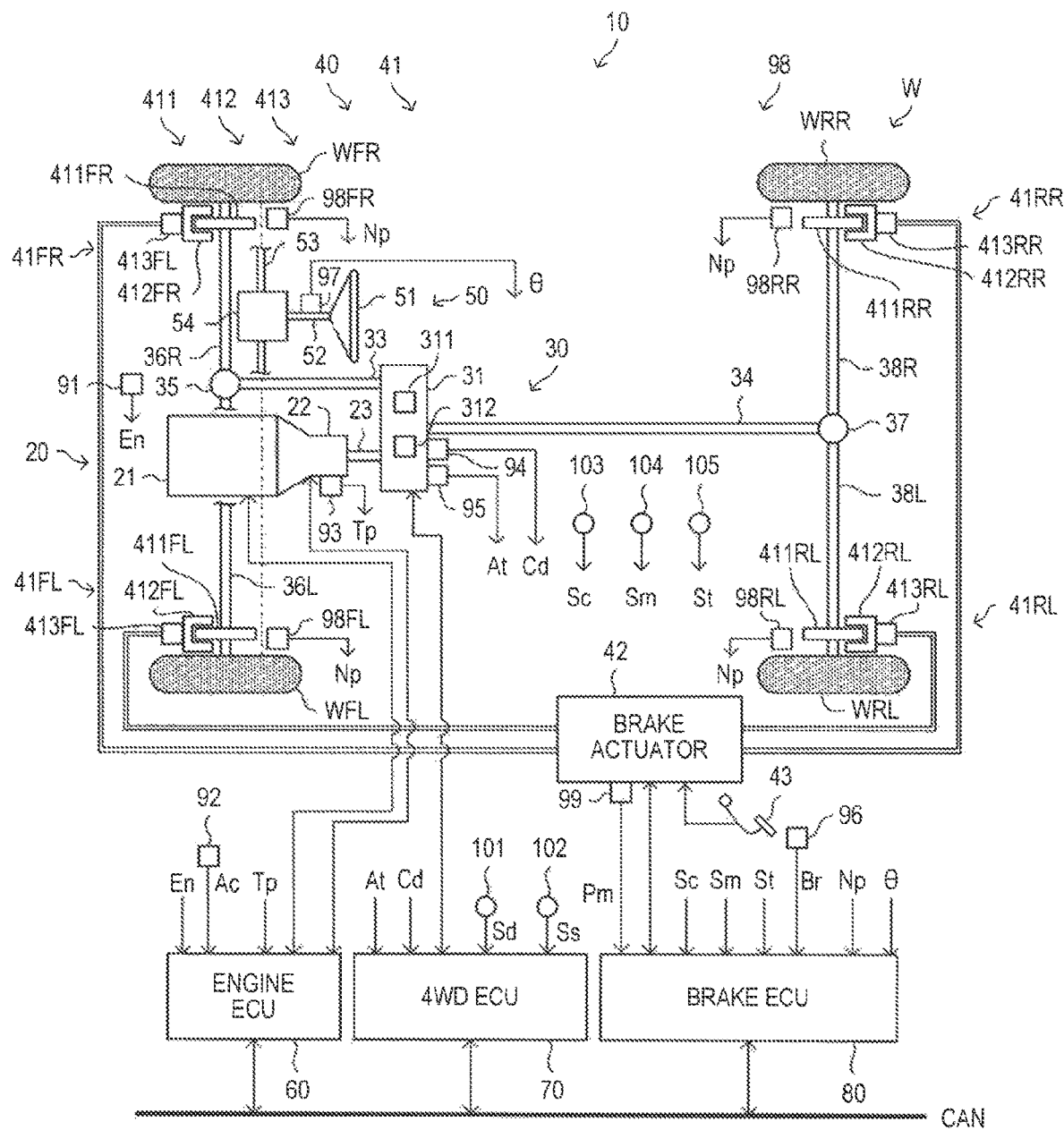
FIG. 1 is a schematic block diagram of a vehicle to which a driving assist apparatus for a vehicle is applied.

A driving assist apparatus for a vehicle according to an embodiment of the present disclosure (hereinafter referred to as "present assist apparatus") is applied to a vehicle 10, as shown in FIG. 1. The vehicle 10 comprises a driving device 20, a driving force transmission mechanism 30, a brake apparatus 40, a steering apparatus 50, and an engine ECU 60, a 4WD ECU 70, and a brake ECU 80, etc.

The driving device 20 includes an engine body 21, a main transmission 22, and an output shaft 23. The engine body 21 is a spark-ignition-type multi-cylinder internal combustion engine. The driving device 20 generates driving force for driving a plurality of wheels (a front left wheel WFL, a front right wheel WFR, a rear left wheel WRL, and a rear right wheel WRR) which the vehicle 10 comprises. The main transmission 22 is an automatic transmission which changes gear according to a traveling state of the vehicle 10. The output shaft 23 transmits, to the transmission mechanism 30, the driving force generated by the engine body 21 and output by the main transmission 22.

The driving force transmission mechanism 30 includes a transfer 31, a rotating shaft 33 for front wheels, a rotating shaft 34 for rear wheels, a differential gear 35 for front wheels, a front left wheel axle 36L, a front right wheel axle 36R, a differential gear 37 for rear wheels, a rear left wheel axle 38L, and a rear right wheel axle 38R, etc. The transfer 31 includes a center differential apparatus 311 and a sub transmission (auxiliary transmission) 312.

The center differential apparatus (hereinafter referred to as "C/D") 311 transmits the driving force generated by the driving device 20 to the rotating shaft 33 for front wheels and the rotating shaft 34 for rear wheels, respectively, and configured so as to allow rotational speed difference (differential) between the rotating shaft 33 for front wheels and the rotating shaft 34 for rear wheels. Furthermore, the C/D 311 comprises an actuator, which is not illustrated. This actuator is configured to be able to switch a state of the C/D 311 between a "free state" in which differential between the rotating shaft 33 for front wheels and the rotating shaft 34 for rear wheels is allowed and a "locked state" in which the rotating shaft 33 for front wheels and the rotating shaft 34 for rear wheels are directly linked. When the state of the C/D 311 is the locked state, the ratio of the rotational speed of the rotating shaft 34 for rear wheels to the rotational speed of the rotating shaft 33 for front wheels is a predetermined ratio. In addition, although the predetermined ratio is "1" in this example, it may be a value larger than "1".

The sub transmission 312 is interposed between the output shaft 23 of the driving device 20 and the C/D 311. The sub transmission 312 is configured so as to be able to switch between a four-wheel-drive high-speed gear (H4) and a four-wheel-drive low-speed gear (L4). The four-wheel-drive high-speed gear (H4) is a gear suitable for high speed traveling on a paved road, and the four-wheel-drive low-speed gear (L4) is a gear suitable for low-speed traveling on an off-road.

The differential gear 35 for front wheels transmits driving force of the rotating shaft 33 for front wheels to the front left wheel axle 36L and the front right wheel axle 36R, respectively, and, thereby, drives the front left wheel WFL and the front right wheel WFR to rotate. The differential gear 35 for front wheels allows differential between the front left wheel WFL and the front right wheel WFR. The ratio of the rotational speed of the rotating shaft 33 for front wheels to a mean value of the rotational speed of the front left wheel axle 36L and the rotational speed of the front right wheel axle 36R is determined by a moderating ratio (reduction ratio) of the differential gear 35 for front wheels. Similarly, the differential gear 37 for rear wheels transmits driving force of the rotating shaft 34 for rear wheels to the rear left wheel axle 38L and the rear right wheel axle 38R, respectively, and, thereby, drives the rear left wheel WRL and the rear right wheel WRR to rotate. The differential gear 37 for rear wheels allows differential between the rear left wheel WRL and the rear right wheel WRR. The ratio of the rotational speed of the rotating shaft 34 for rear wheels to a mean value of the rotational speed of the rear left wheel axle 38L and the rotational speed of the rear right wheel axle 38R is determined by a moderating ratio of the differential gear 37 for rear wheels. The moderating ratio of the differential gear 35 for front wheels and the moderating ratio of the differential gear 37 for rear wheels are equal to each other.

Hereafter, the front left wheel WFL, the front right wheel WFR, the rear left wheel WRL, and the rear right wheel WRR will be simply referred to as the wheel W, when positions of them are not specified. Furthermore, at the end of reference signs of members prepared for respective wheels, a subscript FL representing the front left wheel, a subscript FR representing the front right wheel, a subscript RL representing the rear left wheel, and a subscript RR representing the rear right wheel will be attached, respectively. However, those subscripts will be omitted when the positions of the elements provided for respective wheels are not specified.

The brake apparatus 40 comprises a friction brake mechanism 41, a brake actuator 42, and a brake pedal 43, etc. The friction brake mechanism 41 comprises a brake disc 411 fixed to the wheel W, a brake caliper 412 fixed to a vehicle body, and a wheel cylinder 413 built in the brake caliper 412. The friction brake mechanism 41 pushes a brake pad, which is not illustrated, against the brake disc 411 by operating the wheel cylinder 413 with liquid pressure of hydraulic fluid supplied from the brake actuator 42 to generate friction braking force.

The brake actuator 42 is a well-known actuator which can independently adjust the liquid pressure of the hydraulic fluid supplied to the wheel cylinder 413 for each of the wheels. The brake actuator 42 includes a master cylinder, a reservoir, an oil pump, and various valves, which are not illustrated, etc. This brake actuator 42 comprises a treading force (stepping force) liquid pressure circuitry and a control liquid pressure circuitry, which are not illustrated. The treading force liquid pressure circuitry supplies hydraulic fluid to the wheel cylinder 413 from the master cylinder which pressurizes the hydraulic fluid by treading force when the driver of the vehicle 10 treads (step) the brake pedal 43, for example. The control liquid pressure circuitry individually supplies hydraulic fluid which has liquid pressure can be controlled regardless of the treading force of the brake pedal 43 to each of the wheel cylinder 413, respectively.

Furthermore, the control liquid pressure circuitry comprises a power liquid pressure generation apparatus, a control valve, and a liquid pressure sensor. The power liquid pressure generation apparatus has a booster pump and an accumulator, which are not illustrated, and generates high liquid pressure. The control valve adjusts the liquid pressure of the hydraulic fluid output by the power liquid pressure generation apparatus to target liquid pressure and supplies the hydraulic fluid whose liquid pressure has been adjusted to each of the wheel cylinder 413. The liquid pressure sensor detects liquid pressure of each of the wheel cylinder 413.

The steering apparatus 50 comprises a steering wheel 51, a steering shaft 52, a rack shaft and a rack and pinion mechanism 54, etc. The steering wheel 51 and the steering shaft 52 are connected in a coaxially and integrally rotatable manner. The steering shaft 52 and the rack shaft 53 are connected by the well-known rack and pinion mechanism 54. The front left wheel WFL and the front right wheel WFR are connected respectively to both ends of the rack shaft 53 via a knuckle arm, which is not illustrated. Therefore, a rotation (steering) of the steering wheel 51 will change turning angle (steering angle) of the front left wheel WFL and the front right wheel WFR which are turning wheels (steered wheels).

The engine ECU 60 is connected with a 4WD ECU 70 and a brake ECU 80 such that information can be exchanged through CAN (Controller Area Network) communication. The ECU is an abbreviation for an electronic control unit, and is an electronic control circuitry which has a microcomputer including a CPU, a ROM, a RAM, a backup RAM (or nonvolatile memory), an interface I/F, etc. as a main component. The CPU realizes various functions, which will be mentioned later, by executing instructions (routine) stored in the memory (ROM).

The engine ECU is electrically connected with an engine state quantity sensor 91, an accelerator opening sensor 92, and a shift position sensor 93, etc., and is configured to receive output signals from these sensors. The engine state quantity sensor 91 is a crank angle sensor which detects a rotation angle of a crankshaft and a throttle opening sensor which detects a throttle opening, etc., and is configured to generate output signals representing respective state quantities En detected by these sensors. The accelerator opening sensor 92 is configured to generate an output signal representing an operation amount Ac of an accelerator pedal provided so as to be able to be operated by a driver, which is not illustrated. The shift position sensor 93 is configured to generate an output signal representing a shift position Tp of the main transmission 22.

The engine ECU 60 calculates required torque (required driving force) of the driving device 20 based on the signals from the engine state quantity sensor 91 and the accelerator opening sensor 92, etc., and to determine a fuel injection amount, fuel injection timing, ignition timing, etc. based on this required torque. Furthermore, the engine ECU 60 generates driving force by injecting a determined amount of fuel from a fuel injection valve at a determined ignition timing and igniting the fuel at a determined ignition timing using an ignition device to rotate a crankshaft.

The 4WD ECU 70 is electrically connected with a C/D sensor 94 and a sub transmission sensor 95, etc., and is configured to receive output signals from these sensors. The C/D sensor 94 is configured to generate an output signal representing a state Cd of the C/D 311 (whether it is the free state or the locked state).

The sub transmission sensor 95 is configured to generate an output signal representing a selection status At of gear in the sub transmission 312 (which is chosen the four-wheel-drive high-speed gear and the four-wheel-drive low-speed gear).

The 4WD ECU 70 is electrically connected with a C/D locking switch 101 and a transfer selecting switch 102, etc. (refer to Sd and Ss in FIG. 1). The C/D locking switch 101 is a switch operated by a driver in order to alternatively choose the "free state" or the "locked state" of the C/D 311.

The 4WD ECU 70 sets the state of the C/D 311 to the free state by sending out an instruction signal to the actuator of the C/D 311 when the "free state" is chosen by the C/D locking switch 101. Namely, the 4WD ECU 70 allows differential between the rotating shaft 33 for front wheels and the rotating shaft 34 for rear wheels. On the other hand, the 4WD ECU 70 sets the state of the C/D 311 to the locked state by sending out an instruction signal to the actuator of the C/D 311 when the "locked state" is chosen by the C/D locking switch 101. Namely, the 4WD ECU 70 directly links the rotating shaft 33 for front wheels and the rotating shaft 34 for rear wheels.

The transfer selecting switch 102 is a switch operated by a driver in order to alternatively choose an "H4 mode", in which the four-wheel-drive high-speed gear is used, or an "L4 mode" in which the four-wheel-drive low speed gear is used. The 4WD ECU 70 chooses the four-wheel-drive high-speed gear as a gear interposed between the driving device 20 and the C/D 311 by sending out an instruction signal to the sub transmission 312, when the "H4 mode" is chosen by the transfer selecting switch 102. Thereby, the driving force generated by the driving device 20 is transmitted to the C/D 311 through the four-wheel-drive high-speed gear. On the other hand, the 4WD ECU 70 chooses the four-wheel-drive low-speed gear as a gear interposed between the driving, device 20 and the C/D 311 by sending out an instruction signal to the sub transmission 312, when the "L4 mode" is chosen by the transfer selecting switch 102. Thereby, the driving force generated by the driving device 20 is transmitted to the C/D 311 through the four-wheel-drive low-speed gear.

The brake ECU 80 is electrically connected with a crawl control switch 103, a mode selection switch 104, and a turn assist control switch 105, etc. (refer to Sc, Sm, and St in FIG. 1).

The crawl control switch 103 is a switch operated by a driver when choosing whether the driver wishes to perform the crawl control. The crawl control switch 103 is configured to move to an operating position when it is operated (pushed down) in a case where it is in an initial position and to move to the initial position when it is operated (pushed down) in a case where it is in the operating position. The crawl control switch 103 outputs an ON signal (high level signal) when its switch position is in the operating position, and outputs an OFF signal (low level signal) when its switch position is in the initial position.

The mode selection switch 104 is a switch operated by a driver in order that the driver set a "driving mode under the crawl control." The mode selection switch 104 is a dial switch, and has positions corresponding to the following five driving modes. In addition, target vehicle body speed and upper limit wheel speed are set to each of the driving modes.
Low mode:
  target vehicle body speed=1 km/h, upper limit wheel speed=1.8 km/h
Low medium mode:
  target vehicle body speed=2 km/h, upper limit wheel speed=2.8 km/h
Medium mode:
  target vehicle body speed=3 km/h, upper limit wheel speed=3.8 km/h
Medium high mode:
  target vehicle body speed=4 km/h, upper limit wheel speed=4.8 km/h
High mode:
  target vehicle body speed=5 km/h, upper limit wheel speed=5.8 km/h When the turn assist control switch (hereinafter referred to as "TA control switch") 105 is a switch operated by a driver when the driver chooses whether the driver wishes to perform the TA control. The TA control switch 105 is configured to move to an operating position when it is operated (pushed down) in a case where it is in an initial position and to move to the initial position when it is operated (pushed down) in a case where it is in the operating position. The TA control switch 105 outputs an ON signal (high level signal) when its switch position is in the operating position, and outputs an OFF signal (low level signal) when its switch position is in the initial position.

The brake ECU 80 is electrically connected with a brake sensor 96, a steering angle sensor 97, a wheel speed sensor 98, and a master cylinder pressure sensor 99, etc., and is configured to receive output signals from these sensors. The brake sensor 98 is configured to generate an output signal representing a stroke amount Br of the brake pedal 43. The steering angle sensor 97 is disposed in the steering shaft 52, and is configured to generate an output signal representing a steering angle θ of the steering wheel 51. In addition, the steering angle sensor 97 is configured to detect the steering angle θ which is positive when a turning direction of the vehicle 10 is left.

The wheel speed sensor 98 (98FL, 98FR, 98RL, and 98RR) is configured to generate an output signal representing each of rotational speed (numbers of revolution) Np of the front left wheel WFL, the front right wheel WFR, the rear left wheel WRL, and the rear right wheel WRR. The brake ECU 80 calculates wheel speed ωwi (i is fl, fr, rl, or rr) of each wheel based on the signal representing the rotational speed tip and a predetermined tire radius (which is set to "1" for convenience here). The wheel speed sensor 98 and the brake ECU 80 constitute the wheel speed detector. The master cylinder pressure sensor 99 is configured to generate an output signal representing the master cylinder pressure Pm.

When the crawl control which will be mentioned later is not performed, the brake ECU 80 calculates target braking force Fbtfl of the front left wheel WFL, target braking force Fbtfr of the front right wheel WFR, target braking force Fbtrl of the rear left wheel WRL, and target braking force Fbtrr of the rear right wheel WRR based on the master cylinder pressure Pm, for example. Furthermore, the brake ECU 80 can control braking pressure of wheel cylinders 413FL, 413FR, 413RL, and 413RR such that braking force of respective wheels become the corresponding target braking force.

(Operation)

The present assist apparatus performs "crawl control and TA control" as mentioned below.

<Abstract of Crawl Control>

The crawl control is a driving assist control which can make the vehicle 10 travel at a vehicle body speed of a predetermined "target vehicle body speed" specified by a selected driving mode without requiring operation of an accelerator pedal and operation of the brake pedal 43 by a driver. The present assist apparatus performs the crawl control by adjusting magnitude of the driving force generated by the driving device 20 and magnitude or the braking force given to each wheel W by the brake apparatus 40, respectively. In accordance with the crawl control, the driver does not need to perform operation of an accelerator and a brake. Therefore, a driver can be concentrated on steering operation when the vehicle 10 is traveling on an off-road with large unevenness of a road surface, for example.

In a state where the crawl control is not performed, the brake ECU 80 starts the crawl control when execution permission conditions for the crawl control, which will be mentioned below, are satisfied and the crawl control switch 103 is outputting the ON signal. The execution permission conditions for the crawl control are satisfied when all the following conditions are satisfied.

(Execution Permission Conditions for Crawl Control)

The "L4: four-wheel-drive low-speed gear" is chosen in the sub transmission 312.

The shift position of the main transmission 22 is in either one of "D: drive", "S: shift" and "R: reverse." In addition, when the shift position, is "S: shift", a driver can change the number of gear ratios (number of shift steps) of the main transmission 22 by operating a shift lever.

Vehicle body speed is 5 km/h or less (vehicle body speed will be mentioned later.).

Accelerator operation and brake operation are not performed.

In addition, the brake ECU 80 computes the wheel speed ωwi of respective wheels (four wheels) from the signals detected by the wheel speed sensor 98, and chooses lowest wheel speed ωwi among these as vehicle body speed ωx.

Furthermore, the brake ECU 80 chooses the lowest wheel speed ωwi as reference wheel speed ωwref among the wheel speed ωwi of respective wheels, in order to perform the crawl control. The wheel whose wheel speed ωwi was chosen as the reference wheel speed ωwref is referred to as a "reference wheel."

The brake ECU 80 increases the driving force of the driving device 20 by sending out an instruction signal to the engine ECU 60 when the reference wheel speed ωwref is lower than a "predetermined target vehicle body speed specified by selected driving mode" in the crawl control. The brake ECU 80 decreases the driving force of the driving device 20 by sending out an instruction signal to the engine ECU 60 when the reference wheel speed ωwref is higher than the target vehicle body speed. Namely, the brake ECU 80 reduces the driving force of the driving device 20 when the reference wheel speed ωwref is higher than the target vehicle body speed, and increases the driving force of the driving device 20 when the reference wheel speed ωwref is lower than the target vehicle body speed.

Furthermore, the brake ECU 80 increases the pressure (liquid pressure) of the hydraulic fluid corresponding to a wheel whose wheel speed ωwi is higher than the "predetermined upper limit wheel speed specified by the driving mode" among the wheels except the reference wheel Wref out of the respective wheels and thereby increases the braking force given to the wheel. Hereafter, the wheels except the reference wheel Wref may be referred to as "non-reference wheels." The brake ECU 80 decreases the pressure (liquid pressure) of the hydraulic fluid corresponding to a wheel whose wheel speed ωwi is lower than the "upper limit wheel speed specified by the driving mode" among the on-reference wheels and thereby reduces the braking force given to the wheel.

Thus, the reference wheel speed ωwref is controlled so as to be in agreement with the target vehicle body speed by adjusting the driving force, and the wheel speed of the non-reference wheels is controlled so as not to exceed the upper limit wheel speed with the braking force. As a result, even when a driver does not operate accelerator and brake, the vehicle 10 stably travels at vehicle speed close to the target vehicle body speed. The above is abstract of the crawl control. However, as mentioned later, when the crawl control and the TA control are simultaneously performed, the crawl control is performed in a different aspect from the aspect.

<Abstract of TA Control>

The TA control is driving assist control in which the wheel speed of the inside wheel in turning is made lower than the wheel speed of the outside wheel in turning by giving relatively large braking force to the inside rear wheel in turning when a driver turns the vehicle 10 is turned by rotating the steering wheel 51 while the driver is making the vehicle 10 travel at extremely low speed. Since it becomes easier to turn the vehicle 10 by the TA control, turning performance (turning round performance) of the vehicle 10 can be raised.

The brake ECU 80 starts the TA control when the turning assist control request occurs in a state where TA control is not performed. The turning assist control request is generated when the execution permission conditions for the TA control, which will be mentioned below, are satisfied and the turn assist control switch 105 is outputting the ON signal. The execution permission conditions for the TA control are satisfied when all the following conditions are satisfied.

(Execution Permission Conditions for TA Control)

The shift position of the main transmission 22 is either one of the "D: drive" and the "S: shift."

The crawl control is being performed.

Magnitude of a steering angle of the steering wheel 51 |θ| is larger than or equal to a predetermined steering angle θth.

The TA control is effective when a driver has enlarged the amount of rotation of the steering wheel in order to make the vehicle 10 turn with a small turning radius. Then, the predetermined steering angle θth is set to 300 degrees, for example.

The brake ECU 80 sets the target wheel speed for the inside rear wheel in turning to wheel speed lower than "wheel speed of the inside rear wheel in turning in a case where the vehicle 10 is turned by steering (not by the TA control)" in the TA control. In the present embodiment, as will be mentioned in detail, the brake ECU 80 sets this target wheel speed to "0." Therefore, the vehicle 10 rotates with the inside rear wheel in turning as a substantial fulcrum. As a result, the vehicle 10 can be turned with a radius smaller than the minimum turning radius in vehicle specifications of the vehicle 10. However, since this fulcrum is not fixed, it may relatively move with respect to a road surface according to a traveling situation and a road surface situation, etc.

As can be understood from the above-mentioned execution permission conditions for the TA control, the TA control is performed when the crawl control is performed. Hereafter, the TA control be explained for a case where the state of the C/D 311 is the free state and a case where the state of the C/D 311 is the locked state, respectively. In addition, in the present embodiment, both the moderating ratios of the differential gear 35 for front wheels and the differential gear 37 for rear wheels are 1. Therefore, a mean value of the rotational speed of the front left wheel axle 36L and the rotational speed of the front right wheel axle 36R is equal to the rotational speed of the rotating shaft 33 for front wheels. Similarly, a mean value of the rotational speed of the rear left wheel axle 38L and the rotational speed of the rear right wheel axle 38R is equal to the rotational speed of the rotating shaft 34 for rear wheels. Furthermore, the above-mentioned predetermined ratio of the C/D 311 (ratio of the rotational speed of the rotating shaft 34 for rear wheels to the rotational speed of the rotating shaft 33 for front wheels) is 1.

<When the State of the Center Differential Apparatus is the Free States>

Figure 2:
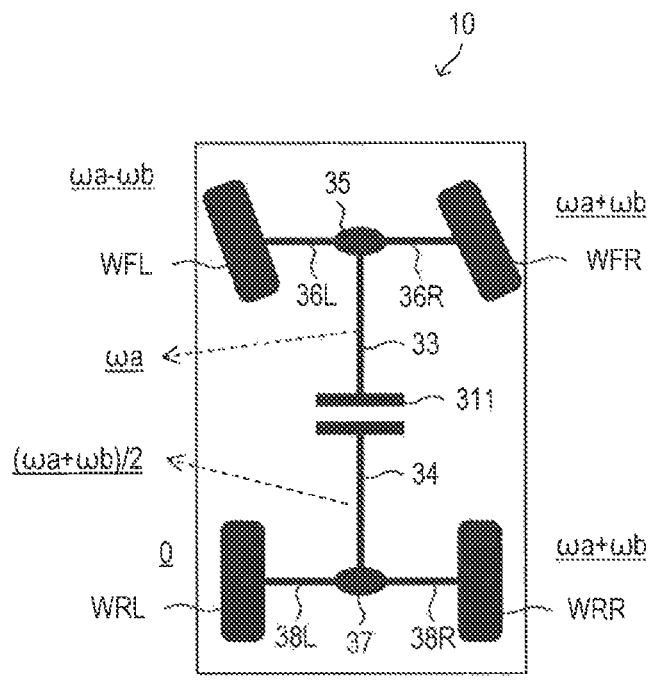
FIG. 2 is a schematic view for explaining an operation of turning assistant control when a state of a center differential apparatus is a free state in the vehicle shown in FIG. 1.

Now, the target vehicle body speed specified by the driving mode selected in the crawl control is defined as a value $\omega a$. In this case, when the vehicle 10 is traveling straight on while performing the crawl control, it can be considered that wheel speed of each of the wheels is substantially equal to the value $\omega a$. Therefore, both the rotational speed of the rotating shaft 33 for front wheels and the rotational speed of the rotating shaft 34 for rear wheels are $\omega a (=(\omega a+\omega a)/2)$. Assume that the turning assist control request occurs when a driver rotates the steering wheel 51 counterclockwise more than the predetermined steering angle θth in order to turn the vehicle 10 to the left from this state and as a result the TA control is started, for example. At this time, the brake ECU 80 sets target wheel speed $\omega wti$ (i is fl, fr, rl, or rr) for each of the wheels according to the following formulae (1) to (4), respectively, as shown in FIG. 2. In the TA control, the wheel speed of the inside rear wheel in turning (in this case, the rear left wheel WRL) is set to "0" as mentioned above.

The target wheel speed of the front left wheel WFL:
$$\omega wtfl=\omega a-\omega b \quad (1)$$

The target wheel speed of the front right wheel SFR:
$$\omega wtfr=\omega a-\omega b \quad (2)$$

The target wheel speed of the rear left wheel WRL:
$$\omega wtrl=0 \quad (3)$$

The target wheel speed of the rear right wheel WRR: $\omega wtrr=\omega a+\omega b$ (4)

Wheel speed $\omega b$ in the above-mentioned formulae (1) to (4) is a value acquired when a central part in a crosswise direction (left and right direction) of the vehicle 10 substantially rotates at speed $\omega a$ by setting the wheel speed of the inside rear wheel in turning (in this case, the rear left wheel WRL) to "0" in a case where the steering angle of the vehicle 10 is θ. The Brake ECU 80 computes the wheel speed $\omega b$ by applying actual "wheel speed $\omega a$ and steering angle θ" to a lookup table Map$\omega b(\omega a, \theta)$ which prescribes a relation between the wheel speed $\omega a$ and steering angle θ and the wheel speed $\omega b$. The table Map$\omega b(\omega a, \theta)$ is predetermined by an experiment and a simulation, etc., and is stored in the ROM in the brake ECU 80. In addition, the wheel speed $\omega b$ is smaller than the wheel speed $\omega a(\omega b<\omega a)$. Furthermore, the wheel speed $\omega b$ becomes higher as the wheel speed $\omega a$ becomes higher, and becomes higher as the magnitude of the steering angle θ becomes larger.

The brake ECU 80 gives braking force of a predetermined value or more to the inside rear wheel in turning (in the above-mentioned example, the rear left wheel WRL) and thereby maintains the wheel speed at "0" which is the target wheel speed $\omega wti$ of the wheel. This braking force of the predetermined value or more is determined based on results of an experiment and a simulation, etc. which were previously performed in consideration of vehicle body speed, a steering angle, a road surface situation, etc. of the vehicle 10. Furthermore, the brake ECU 80 chooses the wheel whose target wheel speed $\omega wti$ is the lowest among the wheels other than the inside rear wheel in turning (in the above-mentioned example, the front left wheel WFL) as the reference wheel Wref. And, the brake ECU 80 adjusts (increases and decreases) the driving force generated by the driving device 20 such that the wheel speed (reference wheel speed $\omega wref$) of the reference wheel Wref becomes the target wheel speed ($\omega a-\omega b$) of the reference wheel. Furthermore, the brake ECU 80 adjusts (increases and decreases) the braking force given to each of the remaining wheels (in the above-mentioned example, the front right wheel WFR and the rear right wheel WRR) such that the wheel speed of the remaining wheels becomes respective target wheel speed (ωa+ωb).

As a result of such TA control, rotational speed ωpf of the rotating shaft 33 for front wheels and rotational speed ωpr of the rotating shaft 34 for rear wheels become values expressed by the following formulae (5) and (6), respectively.

$$\omega pf=(\omega wtfl+\omega wtfr)/2=\omega a \quad (5)$$

$$\omega pr=(\omega wtrl+\omega wtrr)/2=(\omega a+\omega b)/2 \quad (6)$$

Thus, the rotational speed ωpf of the rotating shaft 33 for front wheels is equal to the target vehicle body speed ωa, and does not change, before and after starting execution of the TA control. On the contrary to this, the rotational speed ωpr of the rotating shaft 34 for rear wheels is the target vehicle body speed ωa before starting the TA control, and becomes a value of (ωa+ωb)/2 after starting the TA control. Namely, the rotational speed ωpr of the rotating shaft 34 for rear wheels will fall when the TA control is started. However, since both the front right wheel WFR and the rear right wheel WRR which are outside wheels in turning rotate at "wheel speed (ωa+ωb) larger than the wheel speed ωa of each wheel when the vehicle 10 is traveling straight on while performing the crawl control", the possibility that a driver may feel a strong deceleration feeling when the TA control is started is low.

In addition, the brake ECU 80 sets the target wheel speed ωwti for each of the wheels in accordance with the following formulae (1') to (4') respectively, when the state of the C/D 311 is the free state and the TA control is started in a state where a driver rotates the steering wheel 51 clockwise more than the predetermined steering angle θth in order to turn the vehicle 10.

The target wheel speed of the front left wheel WFL:
$$\omega wtfl=\omega a+\omega b \quad (1')$$

The target wheel speed of the front right wheel WFR: $\omega wtfr=\omega a-\omega b$ (2')

The target wheel speed of the rear left wheel WRL:
$$\omega wtrl=\omega a-\omega b \quad (3')$$

The target wheel speed of the rear right wheel WRR: $\omega wtrr=0$ (4')

<When the State of the Center Differential Apparatus is the Locked State>

When the state of the C/D 311 is the locked state, the rotating shaft 33 for front wheels and the rotating shaft 34 for rear wheels are bound with each other. Therefore, the rotational speed ωpf of the rotating shaft 33 for front wheels and the rotational speed ωpr of the rotating shaft 34 for rear wheels cannot be set to values different from each other, Therefore, if the target wheel speeds are set like the above-mentioned formulae (1) to (4), the rotational speed ωpf of the rotating shaft 33 for front wheels will fall to the rotational speed ωpr(=(ωa+ωb)/2) of the rotating shaft 34 for rear wheels. As a result, since the wheel speed of the outside front wheel in turning becomes lower than (ωa+ωb), a possibility that a driver will feel a deceleration feeling after the startup of the TA control is high.

Figure 3:
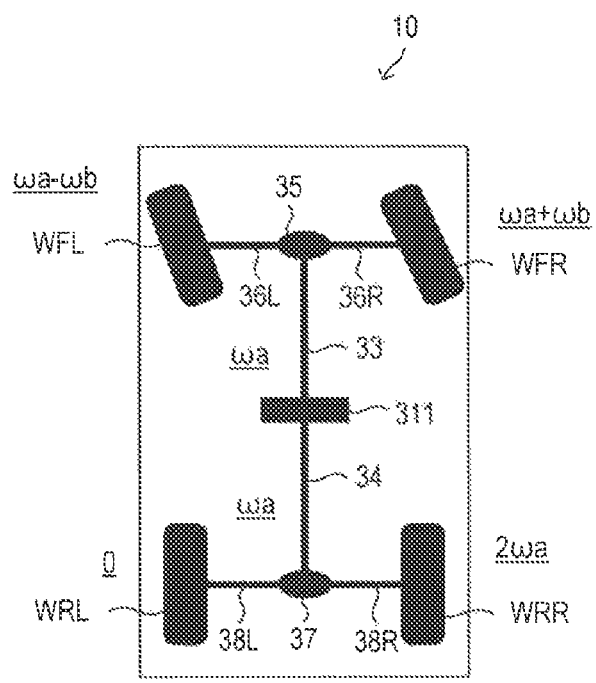
FIG. 3 is a schematic view for explaining an operation of the turning assistant control when the state of the center differential apparatus is a locked state in the vehicle shown in FIG. 1.

Then, as shown in FIG. 3, the brake ECU 80 sets the target wheel speed ωwti (i is fl, fr, rl, or rr) for each of the wheels at the time of performing the TA control when turning to the left, in accordance with the following formulae (7) to (10), respectively.

The target wheel speed of the front left wheel WFL:
$$\omega wtfl=\omega a-\omega b \quad (7)$$

The target wheel speed of the front right wheel WFR: $\omega wtfr=\omega a+\omega b$ (8)

The target wheel speed of the rear left wheel WRL:
$$\omega wtrl=0 \quad (9)$$

The target wheel speed of the rear right wheel WRR: $\omega wtrr=2\omega a$ (10)

In this case, the brake ECU 80 gives braking force of a predetermined value or more to the inside rear wheel in turning (in the above-mentioned example, the rear left wheel WRL) and thereby maintains the wheel speed at "0" (sets the target wheel speed ωwti of the inside rear wheel in turning to "0"). Furthermore, the brake ECU 80 chooses the wheel whose target wheel speed ωwti is the highest among the wheels other than the inside rear wheel in turning (in the above-mentioned example, the rear right wheel WRR) as the reference wheel Wref. And, the brake ECU 80 adjusts (increases and decreases) the driving force generated by the driving device 20 such that the wheel speed (reference wheel speed ωwref) of the reference wheel Wref becomes the target wheel speed (2ωa). Furthermore, the brake ECU 80 adjusts (increases and decreases) the braking force given to each of the remaining wheels (in the above-mentioned example, the front left wheel WFL and the front right wheel WFR) such that the wheel speed of each of the remaining wheels becomes the target wheel speed ωwti for each of the remaining wheels.

As a result of such TA control, the rotational speed ωpf of the rotating shaft 33 for front wheels and the rotational speed ωpr of the rotating shaft 34 for rear wheels become values expressed by the following formulae (11) and (12), respectively.

$$\omega pf=(\omega wtfl+\omega wtfr)/2=\omega a \quad (11)$$

$$\omega pr=(\omega wtrl+\omega wtrr)/2=\omega a \quad (12)$$

In this case, as apparent from the above-mentioned formulae (11) and (12), the rotational speed ωpf of the rotating shaft 33 for front wheels and the rotational speed ωpr of the rotating shaft 34 for rear wheels are equal to each other, and they are equal to those rotational speed ωa when the vehicle 10 is going straight on while performing the crawl control. Furthermore, the front right wheel WFR, which is an outside rear wheel in turning, rotates at the "wheel speed (ωa+ωb) larger than wheel speed ωa of respective wheels when the vehicle 10 is traveling straight on while performing the crawl control", and the rear right wheel WRR, which is an outside wheel in turning, rotates at the wheel speed (2ωa) larger than the wheel speed ωa. Therefore, when the TA control is started a possibility that a driver may feel a strong deceleration feeling can be reduced.

In addition, the brake ECU 80 sets the target wheel speed ωwti for each of the wheels under the TA control while turning to the right in accordance with the following formulae (7') to (10') respectively, when the state of the C/D 311 is the locked state.

The target wheel speed of the front left wheel WFL:
$$\omega wtfl=\omega a+\omega b \quad (7')$$

The target wheel speed of the front right wheel WFR: $\omega wtfr=\omega a-\omega b$ (8')

The target wheel speed of the rear left wheel WRL:
ωwtrl=2ωa     (9′)

The target wheel speed of the rear right wheel
WRR: ωwtrr=0     (10′)

(Specific Operation)
<Driving Assist Control>

Hereafter, an actual operation of the present assist apparatus will be explained. The CPU of the brake ECU 80 (hereinafter simply referred to as "CPU") executes a routine illustrated by flowcharts of FIG. 4 and FIG. 5 every time a constant time elapses. In addition, a crawl control execution flag XCR and a TA control execution flag XTA, which will be mentioned later, are set to "0" respectively, when an ignition key switch of the vehicle 10, which is not illustrated, is changed to an ON position from an OFF position.

Figure 4:
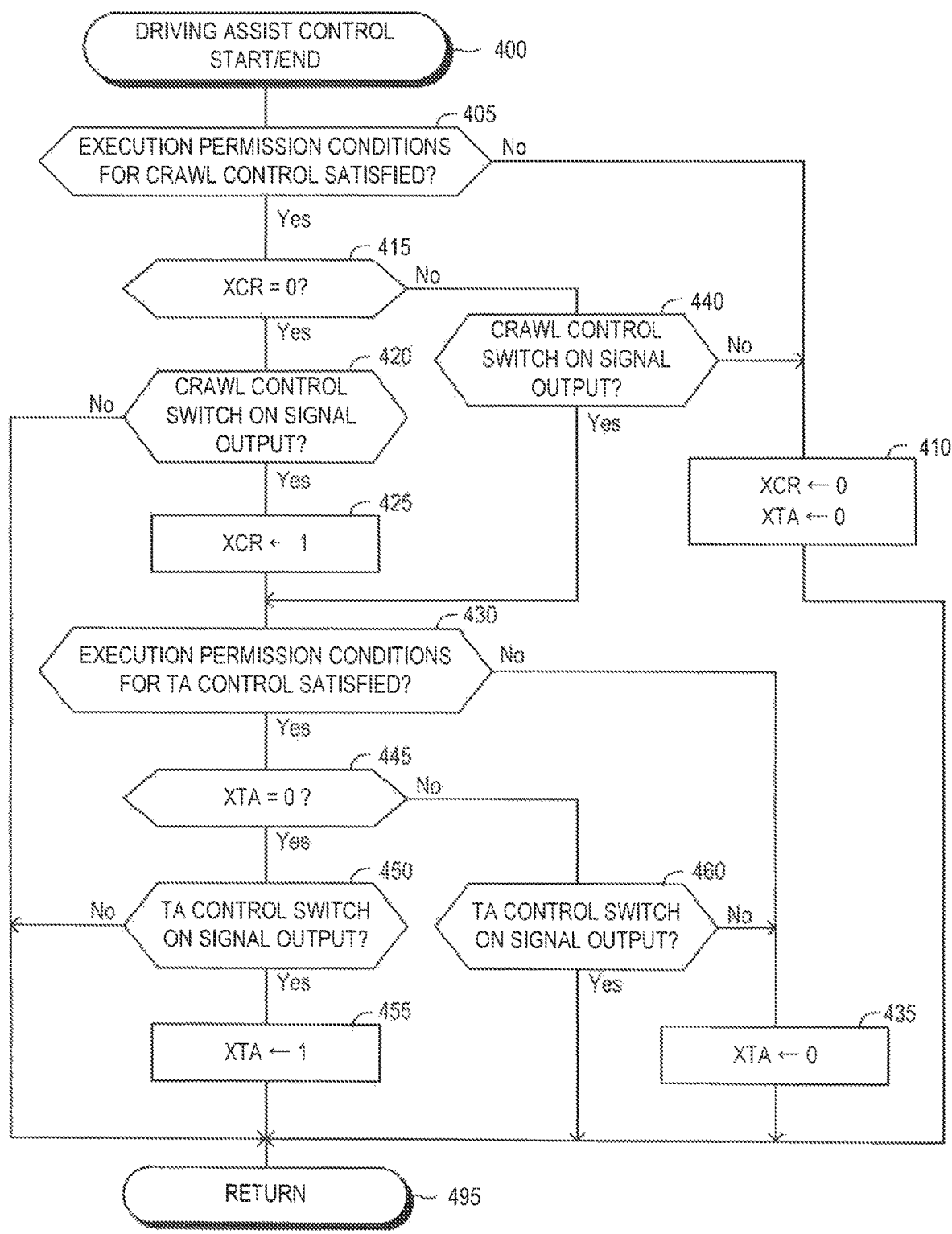
FIG. 4 is a flowchart for showing a "driving assist control start and end routine" which a CPU of a brake ECU shown in FIG. 1 executes.

The CPU changes the value of the flag XCR and the value of the flag XTA by executing the driving assist control start/end routine illustrated by the flowchart of FIG. 4. The value of the flag XCR is set to "1" when the crawl control is performed, and is set to "0" when the crawl control is stopped. Furthermore, the value of the flag XTA is set to "1" when the TA control is performed, and is set to "0" when the TA control is stopped.

The CPU starts processing from Step 400 at a predetermined time point to proceed to Step 405 at which the CPU determines whether the above-mentioned execution permission conditions for the crawl control are satisfied. When the execution permission conditions for the crawl control are not satisfied, the CPU makes "No" determination at Step 405 to proceed to Step 410 at which the CPU sets both the value of the flag XCR and the value of the flag XTA to "0." Then, the CPU proceeds to Step 495 to tentatively terminate the present routine. Therefore, neither the crawl control nor the TA control is executed in this case.

On the contrary to this, when the execution permission conditions for the crawl control are satisfied, the CPU makes "Yes" determination at Step 405 to proceed to Step 415 at which the CPU determines whether the value of the flag XCR is "0". When assuming that the crawl control is not being executed now, the value of the flag XCR is "0." Therefore, the CPU makes "Yes" determination at Step 415 in this case to proceed to Step 420 at which the CPU determines whether the crawl control switch 103 is outputting the ON signal.

When the crawl control switch 103 is outputting the OFF signal, the CPU makes "No" determination at Step 420 to directly proceed to Step 495. In this case, since both the value of the flag XCR and the value of the flag XTA are maintained at "0", neither the crawl control nor the TA control is executed.

On the contrary to this, when a driver wishes to perform the crawl control and has operated (pushed down) the crawl control switch 103, the crawl control switch 103 outputs the ON signal. In this case, the CPU makes "Yes" determination at Step 420 to proceed to Step 425 at which the CPU sets the value of the flag XCR to "1." As a result, the crawl control is performed, as will be mentioned later.

Next, the CPU proceeds to Step 430 to determine whether the above-mentioned execution permission conditions for the TA control are satisfied. When the execution permission conditions for the TA control are not satisfied, the CPU makes "No" determination at Step 430 to proceed to Step 435 at which the CPU sets the value of the flag XTA to "0." Thereafter, the CPU proceeds to Step 495 to tentatively terminate the present routine. In this case, the TA control is not executed, although the crawl control is executed.

When the CPU starts processing of this routine again in this state, the value of the flag XCR is "1." Therefore, the CPU makes "No" determination at Step 415 to proceed to Step 440 at which the CPU determines whether the crawl control switch 103 is outputting the ON signal. When the driver wishes to stop the crawl control and has not operated (pushed down) the crawl control switch 103, the crawl control switch 103 continues outputting the ON signal. Therefore, in this case, the CPU makes "Yes" determination at Step 440 to proceed to Step 430.

When the execution permission conditions for the TA control are satisfied in this state, the CPU makes "Yes" determination at Step 430 when proceeding to the Step 430, proceeds to Step 445, and determines whether the value of the flag XTA is "0". At this time point, since the TA control is not being executed, the value of the flag XTA is "0." In this case, the CPU makes "Yes" determination at Step 445 to proceed to Step 450 at which the CPU determines whether the TA control switch 105 is outputting the ON signal.

When the TA control switch 105 is outputting the OFF signal, the CPU makes "No" determination at Step 440 to directly proceed to Step 495. In this case, the value of the flag XCR is set to "1" and the value of the flag XTA is maintained at "0." Therefore, the TA control is not executed although the crawl control is executed.

On the contrary to this, when the driver wishes to execute the TA control and operates (push down) the TA control switch 105, the TA control switch 105 comes to output the ON signal. In this case, the CPU makes "Yes" determination at Step 450 when proceeding to the Step 450, proceeds to Step 455, and sets the value of the flag XTA to "1." As a result, in addition to the crawl control, the TA control is executed.

When the CPU starts processing of this routine again in this state, the value of the flag XTA is "1." Therefore, the CPU makes "No" determination at Step 445 when proceeding to the Step 445, proceeds to Step 460, and determines whether the TA control switch 105 is outputting the ON signal. When the driver wishes to stop the TA control and does not operate (push down) the TA control switch 105, the TA control switch 105 continues outputting the ON signal. Therefore, in this case, the CPU makes "Yes" determination at Step 460 to directly proceed to Step 495, and tentatively terminates the present routine. As a result, both the crawl control and the TA control are performed.

When the driver wishes to stop the TA control and operates (pushes down) the TA control switch 105 in a situation where both the crawl control and the TA control are being executed, the TA control switch 105 outputs the OFF signal. For this reason, the CPU makes "No" determination at Step 460 when proceeding to the Step 460, proceeds to Step 435, and sets the value of the flag XTA to "0." As a result, although the crawl control continues being executed, the TA control is stopped.

Furthermore, when the driver wishes to stop the crawl control and operates (pushes down) the crawl control switch 103 in a situation where the crawl control is executed at least, the crawl control switch 103 outputs the OFF signal. For this reason, the CPU makes "No" determination at Step 440 when proceeding to the Step 440, proceeds to Step 410, and sets the values of the flag XCR and the flag XTA to "0." As a result, both the crawl controls and the TA controls are stopped.

Figure 5:
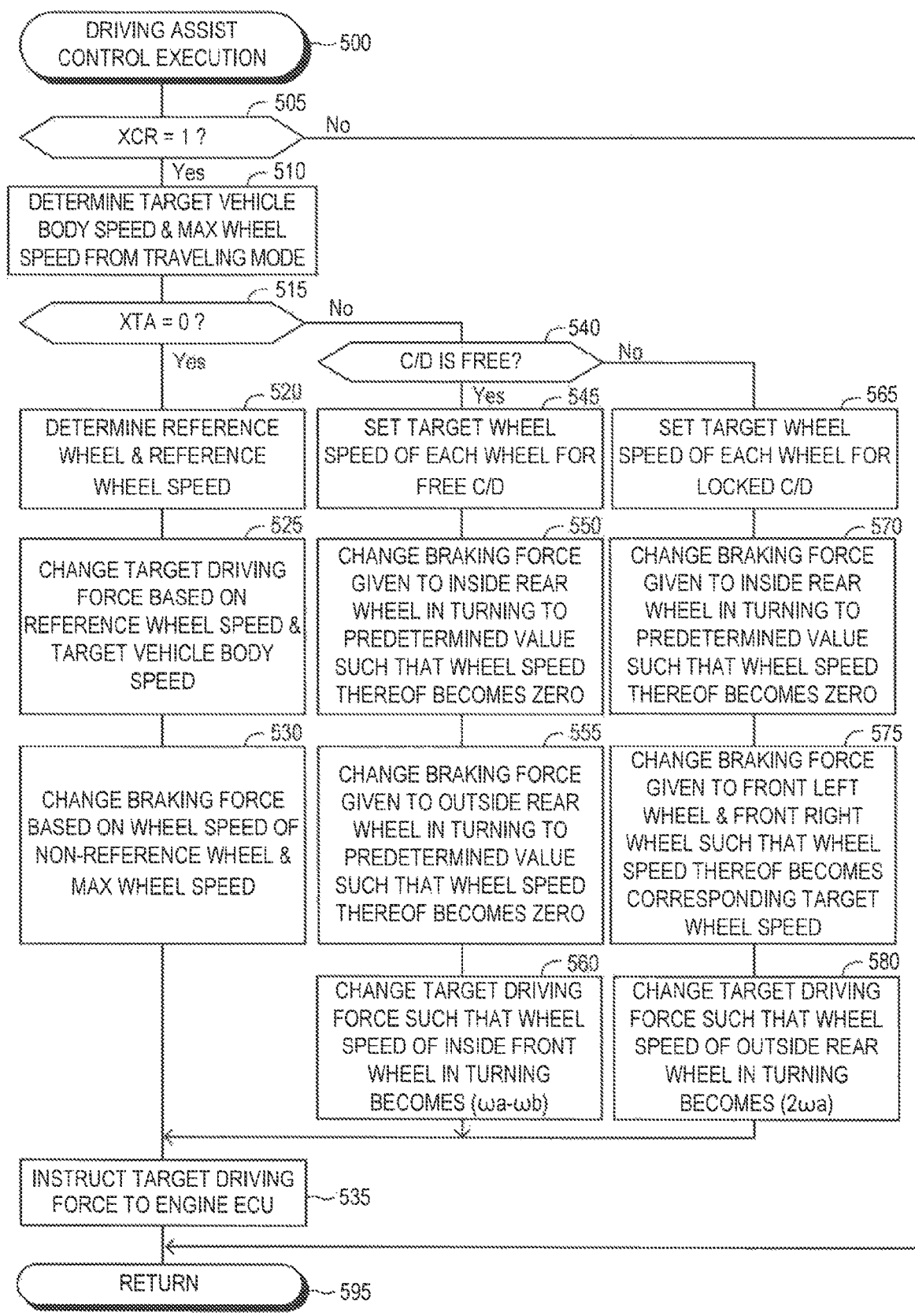
FIG. 5 is a flowchart for showing a "driving assist control execution routine" which the CPU of the brake ECU shown in FIG. 1 executes.

The CPU executes the driving assist control (the crawl control and the TA control) by executing the driving assist control execution routine illustrated by the flowchart of FIG. 5. Hereinafter, it will be divided into some cases and each of the cases will be described.

(When the Value of the Crawl Control Execution Flag XCR is "0")

The CPU starts processing from Step 500 at a predetermined time point to proceed to Step 505 at which the CPU determines whether the value of the flag XCR is "1". In accordance with the above-mentioned assumption, the value of the flag XCR is "0." Therefore, the CPU makes "No" determination at Step 505 to directly proceed to Step 595, and tentatively terminates the present routine. Therefore, in this case, neither the crawl control nor the TA control is executed.

(When the Value of the Crawl Control Execution Flag XCR is "1")

1. When the value of the TA control execution flag XTA is "0"

In this case, the CPU makes "Yes" determination at Step 505 to proceed to Step 510 at which the CPU specifies the "target vehicle body speed we and upper limit wheel speed" which are specified by the traveling mode chosen using the mode selection switch 104. Next, the CPU proceeds to Step 515 to determine whether the value of the flag XTA is "0".

Since the value of the flag XTA is "0" in accordance with the above-mentioned assumption, the CPU makes "Yes" determination at Step 515 to execute in order processing in Step 520 to Step 535 which will be mentioned below, proceeds to Step 595, and tentatively terminates the present routine.

Step 520: The CPU specifies the wheel which has the lowest wheel speed $\omega wi$ among the wheel speed $\omega wi$ of respective wheels as the reference wheel, and specifies the wheel speed $\omega wi$ of the reference wheel as the reference wheel speed $\omega wref$.

Step 525: The CPU increases by a predetermined value a target value of the driving force generated by the driving device 20 (hereinafter referred to as "target driving force") when the reference wheel speed $\omega wref$ is lower than the target vehicle body speed $\omega a$. The CPU decreases the target driving force by a predetermined value when the reference wheel speed $\omega wref$ is higher than the target vehicle body speed $\omega a$.

Step 530: When there is a wheel whose wheel speed $\omega wi$ is higher than the upper limit wheel speed among non-reference wheels (wheels other than reference wheel Wref), the CPU increases the braking force given to the wheel by a predetermined value. Furthermore, when there is a wheel whose wheel speed $\omega wi$ is lower than the upper limit wheel speed among non-reference wheels, the CPU decreases the braking force given to the wheel by a predetermined value.

Step 535: The CPU sends out an instruction signal which represents the target driving force determined at Step 525 to the engine ECU 60. When receiving the instruction signal which represents the target driving force, the engine ECU 60 controls a throttle opening, an ignition timing, and a fuel injection amount, respectively, such that the driving force generated by the driving device 20 becomes in agreement with the target driving force (refer to Japanese Patent Application Laid-Open (Kokai) No. 2013-117206, for example).

2. When the value of the TA control execution flag XTA is "1"

In this case (namely, the flag XCR=1 and the flag XTA=1), it will be further divided into a case where the state of the C/D 311 is the free state and a case where the state of the C/D 311 is the locked state and each of the cases will be described.

2-1: When the state of the C/D 311 is the free state

The CPU makes "Yes" determination at Step 505 to proceed to Step 515 via Step 510. The CPU makes "No" determination at Step 515 to proceed to Step 540 at which the CPU determines whether the state of the C/D 311 is the free state based on the state of the C/D locking switch 101 or the signal received from the 4WD ECU 70.

Since the state of the C/D 311 is the free state in accordance with the above-mentioned assumption, the CPU makes "Yes" determination at Step 540, executes in order processing in Step 545 to Step 560 which will be, mentioned below, and proceeds to Step 595 via Step 535.

Step 545: The CPU sets the target wheel speed of respective wheels in accordance with either one of the above-mentioned formulae (1) to (4) and the above-mentioned formulae (1') to (4'), based on the chosen driving mode, the turning direction of the vehicle 10, and the steering angle θ, etc.

Step 550: The CPU gives sufficiently large braking force to the inside rear wheel in turning such that the wheel speed of the inside rear wheel in turning becomes "0 which is the target wheel speed."

Step 555: The CPU increases by a predetermined value the braking force given to the outside front wheel in turning when the wheel speed of the wheel is higher than the target wheel speed ($\omega a+\omega b$) of the wheel. Furthermore, the CPU decreases by a predetermined value the braking force given to the outside front wheel in turning when the wheel speed of the wheel is lower than the target wheel speed ($\omega a+\omega b$) of the wheel. Similarly, the CPU increases by a predetermined value the braking force given to the outside rear wheel in turning when the wheel speed of the wheel is higher than the target wheel speed ($\omega a+\omega b$) of the wheel. Furthermore, the CPU decreases by a predetermined value the braking force given to the outside rear wheel in turning when the wheel speed of the wheel is lower than the target wheel speed ($\omega a+\omega b$) of the wheel.

Step 560: The CPU determines the target driving force such that the wheel speed of the inside front wheel in turning becomes in agreement with the target wheel speed ($\omega a-\omega b$) of the wheel. Namely, the CPU increases the target driving force by a predetermined value when the wheel speed of the inside front wheel in turning is lower than the target wheel speed ($\omega a-\omega b$) of the wheel. The CPU decreases the target driving force by a predetermined value when the wheel speed of the inside front wheel in turning is higher than the target wheel speed ($\omega a-\omega b$) of the wheel.

2-2: When the state of the C/D 311 is the locked state

In this case, the CPU makes "Yes" determination at Step 505 to proceed to Step 515 via Step 510. The CPU makes "No" determination at Step 515 to proceed to Step 540. Since the state of the C/D 311 is the locked state at this time, the CPU makes "No" determination at Step 540 to execute in order processing of Step 565 to Step 580 which will be mentioned below, and proceeds to Step 595 via Step 535.

Step 565: The CPU sets the target wheel speed of respective wheels in accordance with either one of the above-mentioned formulae (7) to (10) and the above-mentioned formulae (7') to (10'), based on the chosen driving mode, the turning direction of the vehicle 10, and the steering angle θ, etc.

Step 570: The CPU gives sufficiently large braking force to the inside rear wheel in turning such that the wheel speed of the inside rear wheel in turning becomes "0."

Step 575: When the wheel speed of each of the front left wheel WFL and the front right wheel WFR is higher than the target wheel speed of the wheel, the CPU increases by a predetermined value the braking force given to the wheel. Furthermore, when the wheel speed of each of the front left wheel WFL and the front right wheel WFR is lower than the target wheel speed of the wheel, the CPU decreases by a predetermined value the braking force given to the wheel.

Step 580: The CPU determines the target driving force such that the wheel speed of the outside rear wheel in turning becomes in agreement with the target wheel speed ($2\omega a$) of the wheel. Namely, the CPU increases the target driving force by a predetermined value when the wheel speed of the outside rear wheel in turning is lower than the target wheel speed ($2\omega a$) of the wheel. The CPU decreases the target driving force by a predetermined value when the wheel speed of the outside rear wheel in turning is higher than the target wheel speed ($2\omega a$) of the wheel.

The TA control is executed as described above. In the above-mentioned example, the target wheel speed of the inside rear wheel in turning under the TA control was set to 0, and the predetermined braking force (enough to maintain the wheel speed at 0) was given to the inside rear wheel in turning. However, the target rotational speed of the inside rear wheel in turning under the TA control has only to be set to "speed lower than the wheel speed of the inside rear wheel in turning in a case where the vehicle 10 is turned by the front left wheel WFL and the front right wheel WFR being steered in a state where only the crawl control is executed" (hereinafter referred to as "wheel speed $\omega c$ of the inside rear wheel in turning under the TA control") at least.

In this case, the brake ECU 80 sets the target wheel speed $\omega wti$ for each of the wheels in accordance with formulae (13) to (16) respectively, when the TA control is started in a case where the state of the C/D 311 is the free state and a driver rotates the steering wheel 51 counterclockwise in order to turn the vehicle to the left.

The target wheel speed of the front left wheel WFL:
$$\omega wtfl = \omega a - \omega b \qquad (13)$$

The target wheel speed of the front right wheel WFR: $\omega wtfr = \omega a + \omega b$ (14)

The target wheel speed of the rear left wheel WRL:
$$\omega wtrl = \omega c \qquad (15)$$

The target wheel speed of the rear right wheel WRR: $\omega wtrr = \omega a + \omega b$ (16)

Namely, the CPU of the brake ECU 80 sets up the braking force given to the inside rear wheel in turning such that the wheel speed of the wheel becomes the "wheel speed $\omega c$ of the inside rear wheel in turning under the TA control" at Step 550A, which is not shown, in place of Step 550 of FIG. 5. As a result of executing the TA control in this way, the rotational speed $\omega pf$ of the rotating shaft 33 for front wheels and the rotational speed $\omega pr$ of the rotating shaft 34 for rear wheels become values expressed by the following formulae (17) and (18), respectively.

$$\omega pf = (\omega wtfl + \omega wtfr)/2 = \omega a \qquad (17)$$

$$\omega pr = (\omega wtrl + \omega wtrr)/2 = (\omega a + \omega b + \omega c)/2 \qquad (18)$$

In order to attain effect by the TA control, $\omega c$ is set lower than ($\omega a - \omega b$) at least. Namely, a condition that $\omega c < \omega a - \omega b$ is satisfied. Therefore, in accordance with this condition the right side of the above-mentioned formula (18) is smaller than $\omega a$.

In addition, the brake ECU 80 sets the target wheel speed $\omega wti$ for each of the wheels in accordance with formulae (13') to (16') respectively when the TA control is started in a case where the state of the C/D 311 is the free state and a driver rotates the steering wheel 51 clockwise in order to turn the vehicle to the right.

The target wheel speed of the front left wheel WFL:
$$\omega wtfl = \omega a + \omega b \qquad (13')$$

The target wheel speed of the front right wheel WFR: $\omega wtfr = \omega a - \omega b$ (14')

The target wheel speed of the rear left wheel WRL:
$$\omega wtrl = \omega a + \omega b \qquad (15')$$

The target wheel speed of the rear right wheel WRR: $\omega wtrr = \omega c$ (16')

On the other hand, the brake ECU 80 sets the target wheel speed $\omega wti$ for each of the wheels in accordance with formulae (19) to (22) respectively when the TA control is started in a case where the state of the C/D 311 is the locked state and a driver rotates the steering wheel 51 counterclockwise in order to turn the vehicle to the left.

The target wheel speed of the front left wheel WFL:
$$\omega wtfl = \omega a - \omega b \qquad (19)$$

The target wheel speed of the front right wheel WFR: $\omega wtfr = \omega a + \omega b$ (20)

The target wheel speed of the rear left wheel WRL:
$$\omega wtrl = \omega c \qquad (21)$$

The target wheel speed of the rear right wheel WRR: $\omega wtrr = 2\omega a - \omega c$ (22)

Namely, the CPU of the brake ECU 80 sets the braking force given to the wheel such that the wheel speed of the inside rear wheel in turning becomes the "wheel speed $\omega c$ of the inside rear wheel in turning under the TA control" at Step 570A, which is not shown, in placed of Step 570 in FIG. 5. Furthermore, the CPU of the brake ECU 80 changes the target driving force such that the wheel speed of the outside rear wheel in turning becomes the corresponding target wheel speed ($2\omega a - \omega c$) at Step 580A, which is shown, in placed of Step 580 in FIG. 5. Thereby, the rotational speed $\omega pf$ of the rotating shaft 33 for front wheels is prevented from failing to the rotational speed $\omega pr (=(\omega a + \omega b + \omega c)/2)$ of the rotating shaft 34 for rear wheels and, as a result, the wheel speed of the outside front wheel in turning is prevented from becoming lower than ($\omega a + \omega b$). Therefore, a driver can be prevented from feeling a deceleration feeling after the startup of the TA control.

In addition, the brake ECU 80 sets the target wheel speed $\omega wti$ for each of the wheels in accordance with formulae (19') to (22') respectively when the TA control is started in a case where the state of the C/D 311 is the locked state and a driver rotates the steering wheel 51 clockwise in order to turn the vehicle to the right.

The target wheel speed of the front left wheel WFL:
$$\omega wtfl = \omega a + \omega b \qquad (19')$$

The target wheel speed of the front right wheel WFR: $\omega wtfr = \omega a - \omega b$ (20')

The target wheel speed of the rear left wheel WRL:
$$\omega wtrl = 2\omega a - \omega c \qquad (21')$$

The target wheel speed of the rear right wheel WRR: $\omega wtrr = \omega c$ (22')

As explained above, the present assist apparatus is configured to execute the following TA control (turning assist control) when a predetermined turning assist control request occurs and the state of the center differential apparatus 311 is the locked state in a case where the vehicle 10 is turned by the front left wheel MI and the front right wheel WFR being turned in a state where the crawl control (extremely low speed traveling control) is being executed.

First, the present assist apparatus sets the target wheel speed ωwti of the inside rear wheel in turning among the plurality of the wheels to wheel speed lower than the wheel speed of the inside rear wheel in turning in a case where the vehicle 10 is turned by steering, as the TA control.

Furthermore, the present assist apparatus sets the target wheel speed ωwti for each of the wheels other than the inside rear wheel in turning among the plurality of the wheels such that the ratio of the target rear wheel mean value that is a mean value of the target wheel speed of the rear left wheel WRL and the target wheel speed of the rear right wheel WRR to the target front wheel mean value that is a mean value of the target wheel speed ωwtfl of the front left wheel WFL and the target wheel speed ωwtfr of the front right wheel WFR becomes equal to a predetermined ratio and the target front wheel mean value becomes equal to the target vehicle body speed ωa.

In addition, the present assist apparatus adjusts the driving force generated by the driving device 20 and the braking force given to each of the plurality of the wheels by the brake apparatus 40 such that the detected wheel speed of each of the plurality of the wheels becomes equal to the target wheel speed ωwti set for each of the wheels.

In accordance with this configuration, since the ratio of the target rear wheel mean value to the target front wheel mean value is controlled so as to become equal to the predetermined ratio and the target front wheel mean value is controlled so as to become equal to the target vehicle body speed even in a case where the state of the center differential apparatus 311 is the locked state, the vehicle body speed will not fall when the TA control is performed. As a result, the possibility that a driver may feel a strong deceleration feeling when the TA control is started can be reduced.

<Modifications>

The present disclosure is not limited to the above-mentioned embodiments, and various modifications can be adopted within the scope of the present disclosure as will be mentioned below.

In the above-mentioned embodiments, the TA control was performed when the crawl control is being performed, and the driving force of the engine and the braking force of each of the wheels were adjusted such that the rotational speed of the rotating shaft for front wheels and the rotational speed of the rotating shaft for rear wheels become in agreement with each other. On the other hand, in a driving assist apparatus for a vehicle according to a modification (hereinafter referred to as "modified apparatus"), even when the crawl control is not being performed, only the TA control may be performed and the TA control may be performed in combination with traction control when a vehicle travels at low speed.

In other words, as long as a condition that the vehicle body speed ωx is predetermined vehicle body speed or less, the steering angle θ is a predetermined steering angle θth or more, and the TA control switch 105 outputs the ON signal are satisfied, the modified apparatus can perform the TA control even when the driver is performing an accelerator operation and a brake operation.

When the TA control is performed, since the braking force is given such that the rotational speed (wheel speed) of the inside rear wheel in turning becomes "0", the wheel will not idle (race). On the other hand, the wheels except the inside rear wheel in turning are allowed to idle (race).

Then, the brake ECU of the modified apparatus is configured to perform well-known traction control for securing a slip ratio of a wheel (driving wheel) except the inside rear wheel in turning by giving braking force to the driving wheel such that the slip of the driving wheel is cancelled in a case where the driving wheel is judged to have caused idle (slip) when the vehicle 10 is accelerating.

More specifically, the brake ECU computes a slip ratio SL (=(ωi−ωx)/ωi) based on the computed vehicle body speed ωx and wheel speed ωi of each driving wheel. When there is a driving wheel (hereinafter referred to as "control-target driving wheel") whose slip ratio SL is computed to be a predetermined control start threshold value SLs or more, the brake ECU starts the traction control and gives predetermined braking force to the control-target driving wheel. Thereby, the slip ratio SL of the control-target driving wheel decreases. Thereafter, when the slip ratio SL of the control-target driving wheel becomes a predetermined control end threshold value SLe or less, the brake ECU ends the traction control and stops giving the braking force to the control-target driving wheel. Thereby, the wheel except the inside rear wheel in turning can be avoided from idling (slipping) to make the behavior of the vehicle unstable during the TA control.

Although an internal combustion engine (engine) and an automatic transmission were used as the driving device 20 in the above-mentioned embodiments, any driving devices for a vehicle well-known in the art, such as a combination of a motor and a common transmission and a hybrid system which is a combination of an internal combustion engine, a motor and a transmission, may be used. Furthermore, well-known in-wheel motors which respectively drive each of the wheels may be used as a driving device.

Although a friction brake apparatus was used as the brake apparatus 40 in the above-mentioned embodiments, a regenerative braking apparatus using the in-wheel motor may be used in combination with the friction brake apparatus.

Although an engine ECU which controls the driving device 20, a 4WD ECU which controls the driving force transmission mechanism 30, and a brake ECU which controls the brake apparatus 40 were used in the above-mentioned embodiment, two or more ECUs among these ECUs may be unified into one ECU.

What is claimed is:

1. A driving assist apparatus for a vehicle, applied to a vehicle comprising:
    a plurality of wheels including a front left wheel, a front right wheel, a rear left wheel, and a rear right wheel,
    a driving device which generates driving force for the vehicle,
    a rotating shaft for front wheels for transmitting the driving force to the front left wheel and the front right wheel,
    a differential gear for front wheels which is disposed between the front left wheel and the front right wheel and the rotating shaft for front wheels, and allows differential between the front left wheel and the front right wheel,
    a rotating shaft for rear wheels for transmitting the driving force to the rear left wheel and the rear right wheel,
    a differential gear for rear wheels which is disposed between the rear left wheel and the rear right wheel and the rotating shaft for rear wheels, and allows differential between the rear left wheel and the rear right wheel, a center differential apparatus configured to be enable to selectively realize at least two states of a free state that is a state where differential between the rotating shaft for front wheel and the rotating shaft for rear wheels is allowed and a locked state that is a state where the rotating shaft for front wheels and the rotating shaft for rear wheels are directly connected, and configured such that a ratio of rotational speed of the rotating shaft for rear wheels to rotational speed of the rotating shaft for front wheels becomes a predetermined ratio in the locked state, and a brake apparatus which gives braking force to each of the plurality of the wheels, and the driving assist apparatus for a vehicle comprises:

a wheel speed detector which detects wheel speed of each of the plurality of the wheels, and a control part which performs extremely low speed traveling control in which the driving force generated by the driving device and the braking force given to each of the plurality of the wheels by the brake apparatus are adjusted such that vehicle body speed of the vehicle is in agreement with a predetermined target vehicle body speed, without requiring an accelerator operation and a brake operation by a driver of the vehicle;

wherein:

the control part is configured to perform turning assist control in which:

when a predetermined turning assist control request occurs and the state of the center differential apparatus is the locked state in a case where the vehicle is turned by the front left wheel and the front right wheel being steered in a state where the extremely low speed traveling control is performed, target wheel speed of an inside rear wheel in turning among the plurality of the wheels is set to wheel speed lower than wheel speed of the inside rear wheel in turning in a case where the vehicle is turned by steering, and target wheel speed of each of wheels other than the inside rear wheel in turning among the plurality of the wheels are respectively set such that a ratio of a target rear wheel mean value that is a mean value of target wheel speed of the rear left wheel and target wheel speed of the rear right wheel to a target front wheel mean value that is a mean value of target wheel speed of the front left wheel and target wheel speed of the front right wheel is equal to the predetermined ratio and the target front wheel mean value becomes equal to the target vehicle body speed, and the driving force generated by the driving device and the braking force given respectively to the plurality of the wheels by the brake apparatus are adjusted such that the wheel speed detected for each of the plurality of the wheels becomes equal to the target wheel speed set for each of the plurality of the wheels.

2. The driving assist apparatus for a vehicle, according to claim 1, wherein:

the control part is configured to set the target wheel speed of the inside rear wheel in turning in the turning assist control to zero.

3. The driving assist apparatus for a vehicle, according to claim 2, wherein:

the control part is configured to, when the predetermined ratio is 1, set the target wheel speed of an outside rear wheel in turning in the turning assist control to a value ($2\omega a$) that is twice as much as the target vehicle body speed ($\omega a$), set the target wheel speed of an inside front wheel in turning in the turning assist control to a value ($\omega a - \omega b$) obtained by subtracting a predetermined value ($\omega b$) from the target vehicle body speed ($\omega a$), and set the target wheel speed of an outside front wheel in turning in the turning assist control to a value ($\omega a + \omega b$) obtained by adding the predetermined value ($\omega b$) to the target vehicle body speed ($\omega a$).

\* \* \* \* \*

UNITED STATES PATENT AND TRADEMARK OFFICE
CERTIFICATE OF CORRECTION

PATENT NO. : 10,889,299 B2  
APPLICATION NO. : 16/284176  
DATED : January 12, 2021  
INVENTOR(S) : Taisuke Yasutomi Page 1 of 1

It is certified that error appears in the above-identified patent and that said Letters Patent is hereby corrected as shown below:

In the Specification

In Column 7, Line(s) 5, after second occurrence of "shaft", insert --53,--.

In Column 9, Line(s) 18, delete "98" and insert --96--, therefor.

In Column 9, Line(s) 61, delete "or" and insert --of--, therefor.

In Column 10, Line(s) 57, delete "on-reference" and insert --non-reference--, therefor.

In Column 11, Line(s) 51, after "control", insert --will--.

In Column 12, Line(s) 25 & 26, equation 2, delete "SFR: ωwtfr= ωa-ωb" and insert --WFR: ωwtfr = ωa+ωb--, therefor.

In Column 13, Line(s) 45 & 46, equation 3′, delete "ωa-ωb" and insert --ωa + ωb--, therefor.

In Column 13, Line(s) 57, after "other", delete "," and insert --.--, therefor.

In Column 14, Line(s) 56, after "started", insert --,--.

In Column 17, Line(s) 22, delete "we" and insert --ωa--, therefor.

In Column 18, Line(s) 14, after "be", delete ",".

In Column 19, Line(s) 65, after "condition", insert --,--.

In Column 21, Line(s) 6, delete "MI" and insert --WFL--, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*